W. T. HENSLEY.
ALTERNATING CURRENT DYNAMO ELECTRIC MACHINE.
APPLICATION FILED JUNE 8, 1912.
1,259,097.
Patented Mar. 12, 1918.
5 SHEETS—SHEET 5.
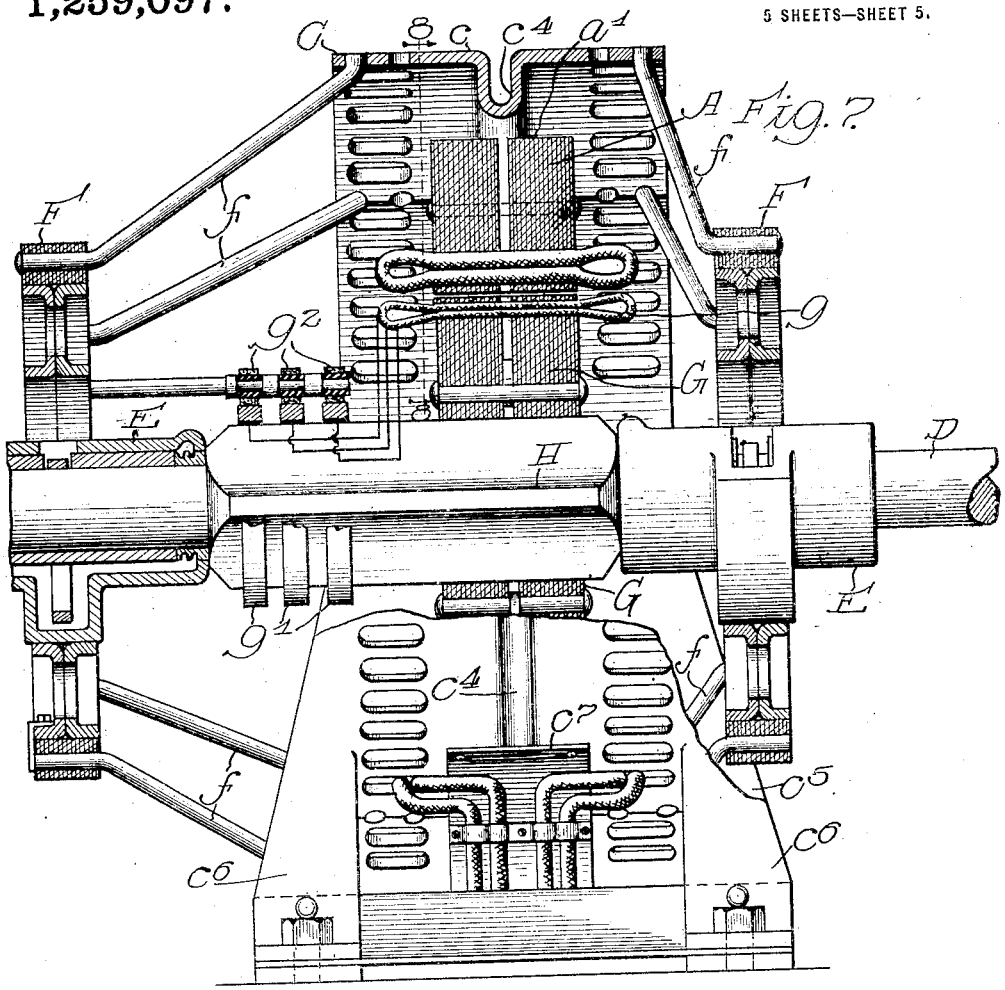
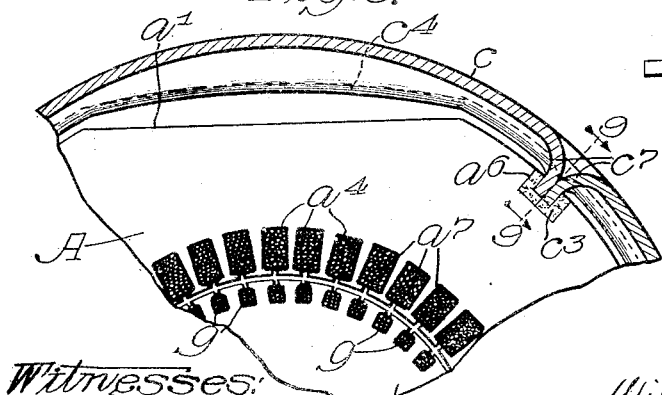
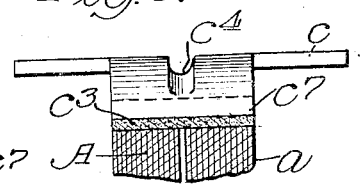

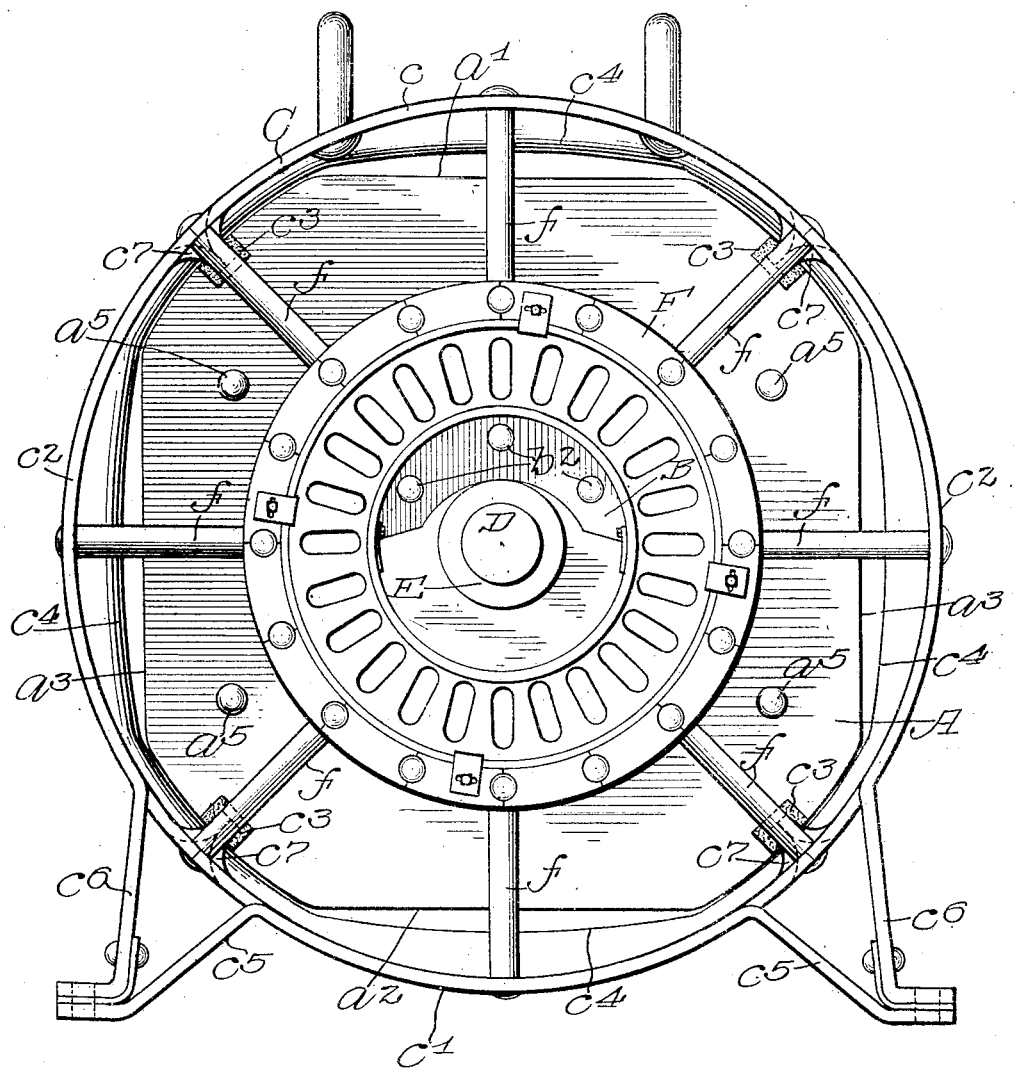

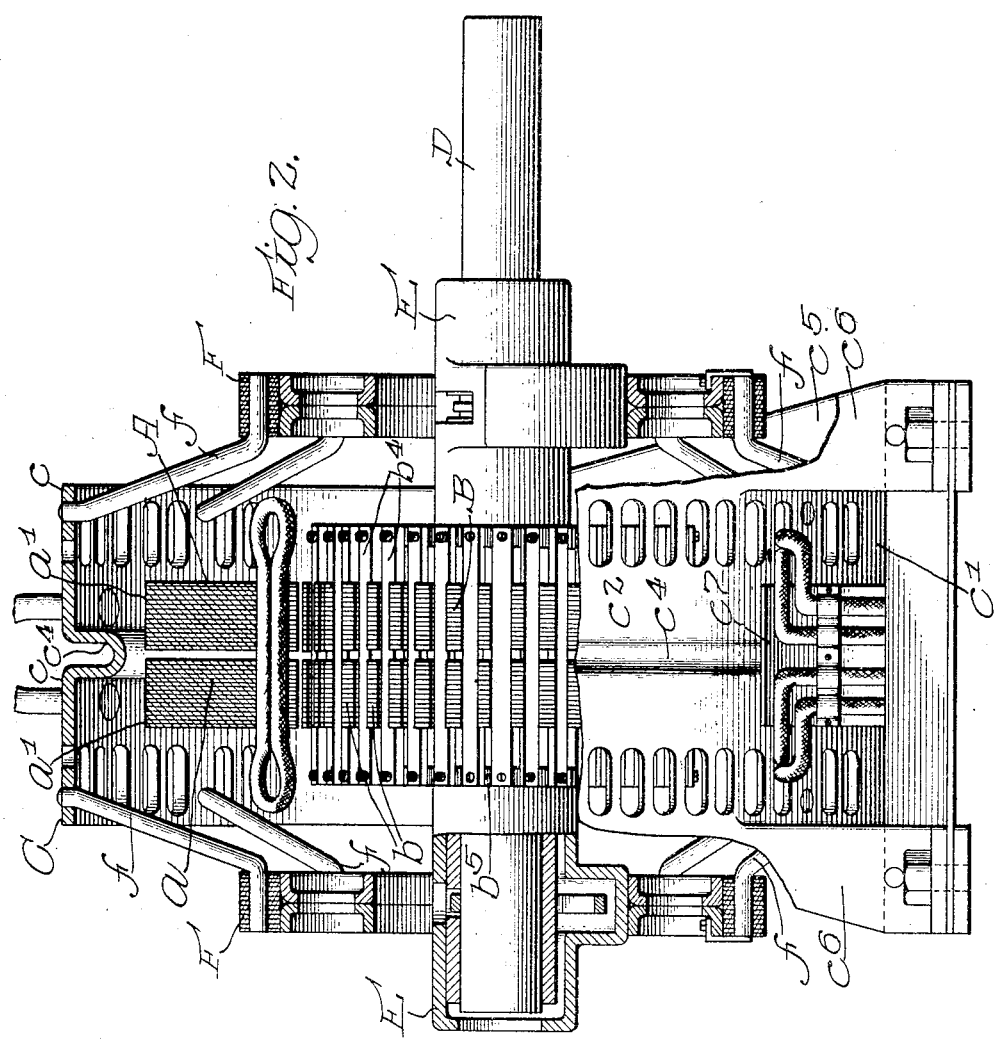

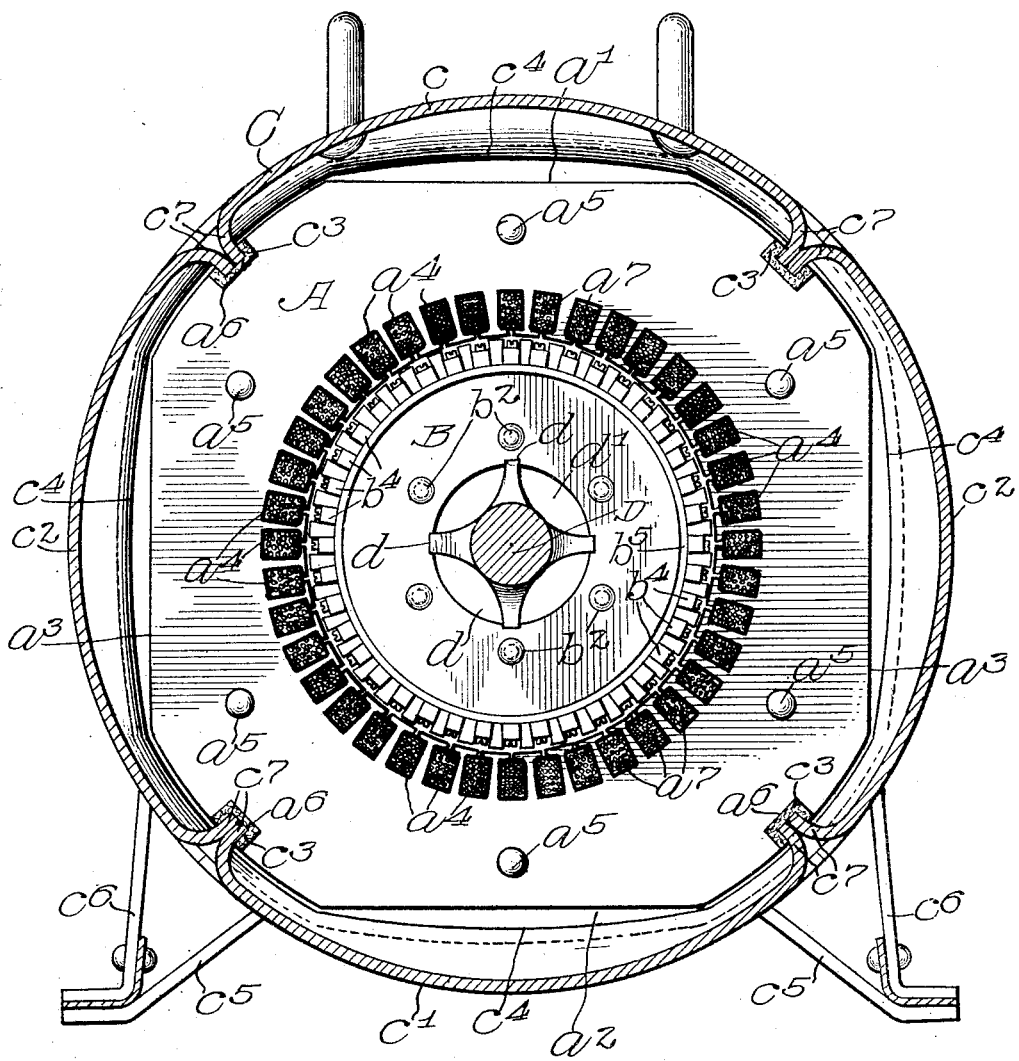

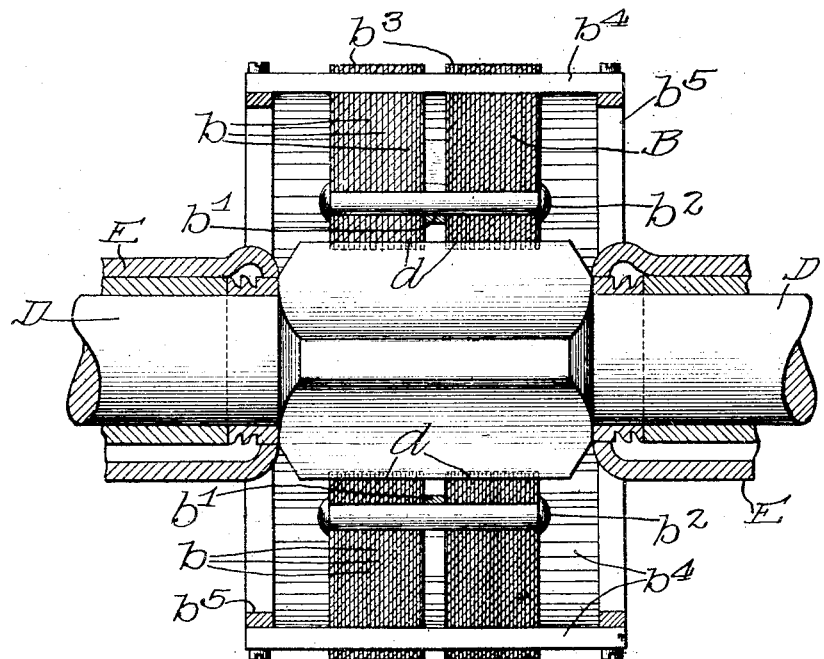
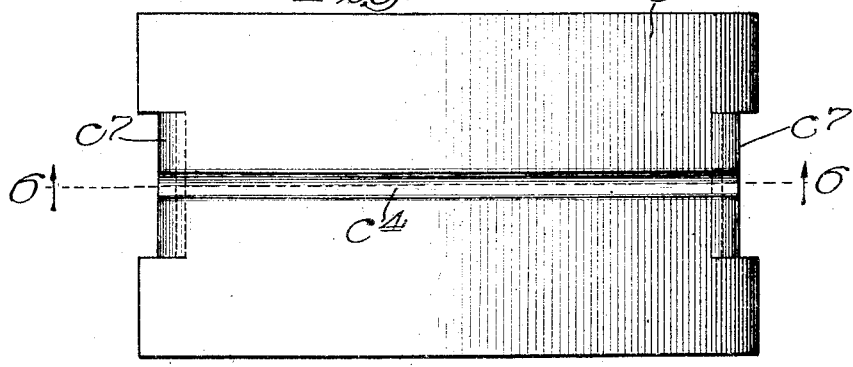
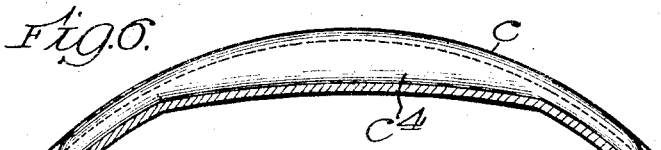

UNITED STATES PATENT OFFICE.

WILLIAM T. HENSLEY, OF CONNERSVILLE, INDIANA, ASSIGNOR, BY MESNE ASSIGNMENTS, TO BOUND BROOK ENGINE & MFG. CO., A CORPORATION OF DELAWARE.

ALTERNATING-CURRENT DYNAMO-ELECTRIC MACHINE.

1,259,097.　　　Specification of Letters Patent.　　Patented Mar. 12, 1918.

Application filed June 8, 1912. Serial No. 702,482.

*To all whom it may concern:*

Be it known that I, WILLIAM T. HENSLEY, a citizen of the United States of America, and resident of Connersville, Fayette county, Indiana, have invented a certain new and useful Improvement in Alternating-Current Dynamo-Electric Machines, of which the following is a specification.

My invention relates to dynamo electric machinery in general, such as generators and motors, and more especially to machines of the kind illustrated in my prior application, filed May 23, 1911, Serial No. 628,904.

In said prior application I have shown a direct current dynamo electric machine. Generally stated, the object of my present invention is to provide a novel construction of alternating current dynamo electric machine of such character that, like the said direct current machine, sheet metal can be employed in place of castings, throughout practically the entire structure thereof, as will hereinafter more fully appear.

It is also an object to provide certain details and novel features of construction tending to increase the general efficiency and serviceability of an alternating current dynamo electric machine of this particular character.

The principal object is, of course, to provide a novel and improved construction of such character that sheet metal can be used in a manner that will very greatly and very materially reduce the cost of manufacture of generators and motors of the alternating current type.

To these and other useful ends, my invention consists in matters hereinafter set forth and claimed.

In the accompanying drawings—

Figure 1 is an end elevation of an alternating current dynamo electric machine embodying the principles of my invention.

Fig. 2 is a side elevation of the machine shown in Fig. 1, with certain portions thereof shown in vertical longitudinal section.

Fig. 3 is a transverse section through the casing of the said machine, showing the stator and rotor in elevation, the shaft of the rotor being also in section.

Fig. 4 is an enlarged longitudinal section of the said rotor, showing a portion of the shaft in side elevation, and showing adjacent portions of the shaft housings in section.

Fig. 5 is a plan view of one of the sections of the sheet metal casing.

Fig. 6 is a section on line 6—6 in Fig. 5.

Fig. 7 is a view similar to Fig. 2, but showing the machine equipped with a different type of rotor—that is to say, in Fig. 2 the rotor is of the so-called squirrel cage type, whereas in Fig. 7 the rotor is equipped with coils or windings connected in circuit with the usual brushes and collecting rings on the shaft.

Fig. 8 is a detail section on line 8—8 in Fig. 7.

Fig. 9 is a detail section on line 9—9 in Fig. 8.

As thus illustrated, and referring more particularly to Figs. 1 to 6 inclusive, it will be seen that my invention comprises a stator A, a rotor B, and a casing or frame C, the said rotor being mounted upon a shaft D supported in bearings or housings E of any suitable, known or approved character, but preferably of the kind shown. The said bearings or housings E are suitably mounted in bracket rings F, supported on bracket rods $f$, which latter are in turn secured to the rims or overhanging portions of the said casing.

The said stator A is laminated in character, being composed of thin plates $a$ of paramagnetic metal, each plate being in the form of a ring flattened at top and bottom and at the sides thereof, whereby the body of the stator A has a flat top $a^1$, a flat bottom $a^2$, and flat sides $a^3$, the said sides being at right angles to the said top and bottom. Also, each sheet metal plate of the stator has its inner edge formed with a circular row of notches $a^4$, said notches being provided with restricted or narrowed inlet openings, whereby each notch is practically a closed or circumscribed opening. These notches, when the plates are all together, provide the stator with a series of inner parallel grooves or recesses, which extend longitudinally of the machine, and which are parallel with the axis of the rotor. The plates of the stator may be held together in any suitable, known or approved manner as by bolts or rivets $a^5$ which extend parallel with the axis of the machine. Furthermore, each sheet metal plate of the stator is provided with four equidistant notches $a^6$ in the outer edge thereof, which notches provide outer parallel grooves when the plates of the stator are assembled, it being observed that the laminæ of the stator are disposed in planes at right angles to the axis of the machine. The windings or coils $a^7$ are suitably disposed in the grooves provided by the notches $a^4$ and applied in any suitable, known or approved manner.

The casing C is composed of upper and lower sections $c$ and $c^1$ and the two side sections $c^2$, the said sections being made of sheet metal and arranged end to end, whereby the casing is substantially cylindric in character. The meeting ends of the said section are inturned and fastened in the grooves $a^6$ by means of fillings of Babbitt metal $c^3$, or in any other suitable manner. If desired, the inturned ends of the section may be welded or otherwise fastened together. Each section has a longitudinal and centrally arranged fold or rib $c^4$, as shown more clearly in Figs. 5 and 6, which rib is larger at its central or middle portion and tapers toward the opposite ends thereof, whereby it is of maximum depth at its center. It will be seen that these ribs are located opposite the flat bottom and top and sides of the stator, and that by reason of this formation a very strong and rigid frame or casing is provided for the machine. The bottom section $c^1$ is provided with downturned end portions $c^5$, and the side sections $c^2$ are provided with outwardly displaced similar end portions $c^6$ that connect with the portions $c^5$, in any suitable manner, to form the legs of the machine. It will be seen that the inturned end portions $c^1$ of the said casing sections are not of the full width of these sections, whereby the casing has a continuous or cylindric rim or overhanging portion at each end thereof. If desired, the overhanging end portions of the casing can be perforated or apertured in any suitable manner to afford ventilation.

The rotor B, as shown in Fig. 4, is laminated in character, being composed of sheet metal plates $b$ of any suitable paramagnetic metal, each plate being in the form of a flat ring, and the several plates being divided into two sections, and the two sections being spaced apart by suitable spacers $b^1$ arranged at regular intervals around the rotor. The laminæ of the rotor, and the two sections thereof, are bound or held tightly together by the bolts or rivets $b^2$ that extend through the same in directions parallel with the axis of the machine. The laminæ or plates of the rotor are provided at their outer edges with notches $b^3$ arranged at regular intervals around the edge thereof, whereby the rotor is provided on its outer surface with parallel grooves or recesses that extend longitudinally of the machine and which are parallel with the axis of the rotor. The induction bars $b^4$ are inserted in these grooves or notches $b^3$, said bars being of brass or copper or other suitable, known or approved material. These bars $b^4$ are held against displacement by the rings $b^5$ to which their ends are suitably secured, a rotor of this character being what is ordinarily known as the squirrel cage type of rotor. The inner edges of the laminæ or plates of the rotor are provided with notches which form grooves to receive the wings $d$ of the shaft D, which wings provide air spaces $d^1$ for the circulation of the air, the rotor being forced upon the shaft in any suitable manner. By referring to Fig. 2, it will be seen that the laminated body portion of the rotor is of the same thickness or width as the laminated body portion of the stator.

Referring to Figs. 7 to 9 inclusive, it will be seen that the construction here is substantially the same as that shown in the preceding figures, except that in this case the rotor G is provided with coils $g$ instead of the induction bars of the previous construction. These coils $g$ have suitable circuit connections with the collecting rings $g^1$ which latter are well known and well understood and which are engaged by the usual brushes $g^2$ for collecting the current. This form of rotor necessitates a lengthening of the shaft H, but otherwise, and except for the differences in construction necessitated by the use of a different form of rotor, the construction is substantially the same as that previously shown and described.

It will be understood that the various windings and coils shown and referred to may be of any suitable known or approved character, and may be applied in any suitable or desired manner, without departing from the spirit of my invention. With the construction shown and described, an alternating current dynamo electric machine, either a generator or a motor, is produced in which sheet metal is employed practically for the entire structure thereof, the heavy or cumbersome and expensive castings heretofore employed in machines of this character being entirely dispensed with.

What I claim as my invention is—

1. An alternating current dynamo machine provided with a stator comprising a laminated body of paramagnetic metal, with the laminæ thereof disposed in planes at right angles to the axis of the machine, means for holding the laminæ together, and a sectional sheet metal casing extending around said stator, held together thereby, forming a supporting frame therefor, said sections having meeting edges extending transversely of the circumference.

2. An alternating current dynamo machine provided with a stator comprising a laminated body of paramagnetic metal, with the laminæ thereof disposed in planes at right angles to the axis of the machine, and means for holding the laminæ together, said stator having outer parallel grooves, and a sheet metal casing made in sections, the meeting ends of said sections being fastened in said outer grooves.

3. An alternating current dynamo machine provided with a stator comprising a laminated body of paramagnetic metal, with the laminæ thereof disposed in planes at right angles to the axis of the machine, and means for holding the laminæ together, said body being formed with flat top and bottom and side surfaces, and a sheet metal casing of cylindric form, having inwardly extending strengthening ribs opposite the flat places of said body.

4. A dynamo electric machine having a sheet metal casing of cylindric form, made in sections, and means for attaching the meeting ends of said sections to the machine, each section having an inwardly extending strengthening rib, the rib of each section tapering toward the ends thereof.

5. A dynamo electric machine having a sheet metal casing of cylindric form, made in sections, and means for attaching the meeting ends of said sections to the machine, each section having an inwardly extending strengthening rib, the rib of each section tapering toward the ends thereof, and legs for said casing, each leg comprising two parts, each part integral with a different section.

6. An alternating current dynamo electric machine provided with a rotor, a stator, and a sectional sheet metal casing extending around said stator, the meeting ends of the sections being inturned to engage and support said stator, the meeting ends being suitably secured together and to said stator.

7. A dynamo electric machine comprising a laminated stator, a sectional sheet metal casing therefor of cylindric form, divided transversely of the circumference, and means whereby the casing is held together by the stator, and the stator supported by the casing.

8. A dynamo electric machine comprising a laminated stator, a sectional sheet metal casing therefor, and means whereby the casing is held together by the stator, and the stator supported by the casing, said means including grooves on the stator, and portions engaging said grooves, carried on the casing, extending parallel with the axis of the machine.

9. A dynamo electric machine comprising a laminated stator, a sectional sheet metal casing therefor, and means whereby the casing is held together by the stator, and the stator supported by the casing, said means including portions on the casing, projecting inward, having engagement with the periphery of the stator.

10. A dynamo electric machine comprising a laminated sheet metal stator of ring-form shape, the laminæ extending in parallel planes at right angles to the axis of the machine, a sheet metal casing formed in sections joined together at intervals around the circumference of said stator, a shaft, bearings for said shaft, and rods for supporting said bearings on said casing.

11. A dynamo electric machine comprising a laminated sheet metal stator of ring-form shape, the laminæ extending in parallel planes at right angles to the axis of the machine, a sheet metal casing formed in sections joined together at intervals around the circumference of said stator, a shaft, bearings for said shaft, and rods for supporting said bearings on said casing, said stator having flat spots on the periphery thereof, and said casing having strengthening ribs extending inwardly opposite said spots to stiffen the casing and form a frame for the machine.

12. A dynamo electric machine comprising a laminated sheet metal stator of ring-form shape, the laminæ extending in parallel planes at right angles to the axis of the machine, a sheet metal casing formed in sections joined together at intervals around the circumference of said stator, a shaft, bearings for said shaft, and rods for supporting said bearings on said casing, said sections having interned end edges, said stator having parallel grooves to receive said end edges and hold the casing in position.

Signed by me at Connersville, Ind., this 27th day of May, 1912.

WILLIAM T. HENSLEY.

Witnesses:
 MATIE MOORE,
 JAMES A. CLIFTON.

Copies of this patent may be obtained for five cents each, by addressing the "Commissioner of Patents, Washington, D. C."